United States Patent
Bohlländer

(10) Patent No.: US 11,901,854 B2
(45) Date of Patent: Feb. 13, 2024

(54) DETECTING A DIRECTION OF MOTOR ROTATION IN SINGLE-PHASE CONVERTERS

(71) Applicant: Rolls-Royce Deutschland Ltd & Co KG, Blankenfelde-Mahlow (DE)

(72) Inventor: Marco Bohlländer, Hirschaid (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 237 days.

(21) Appl. No.: 17/617,580

(22) PCT Filed: Jun. 9, 2020

(86) PCT No.: PCT/EP2020/065961
§ 371 (c)(1),
(2) Date: Dec. 8, 2021

(87) PCT Pub. No.: WO2020/249557
PCT Pub. Date: Dec. 17, 2020

(65) Prior Publication Data
US 2022/0239240 A1     Jul. 28, 2022

(30) Foreign Application Priority Data
Jun. 12, 2019 (DE) .................. 10 2019 208 511.3

(51) Int. Cl.
*H02P 6/18* (2016.01)
*H02P 6/30* (2016.01)
(Continued)

(52) U.S. Cl.
CPC ............ *H02P 6/186* (2013.01); *B60L 15/007* (2013.01); *B60L 50/66* (2019.02); *B64D 27/24* (2013.01); *H02P 6/30* (2016.02); *B64D 2221/00* (2013.01)

(58) Field of Classification Search
CPC .......... H02P 27/00; H02P 27/04; H02P 27/06; H02P 27/08; H02P 29/00; H02P 29/028;
(Continued)

(56) References Cited

U.S. PATENT DOCUMENTS

2014/0207335 A1* 7/2014 Mikamo .............. B62D 5/0463
                                                               701/41
2019/0190432 A1   6/2019 Nakayama

FOREIGN PATENT DOCUMENTS

DE    102010029370 A1   12/2011
DE    102014113542 A1   3/2016
(Continued)

OTHER PUBLICATIONS

German Office Action for German Application No. 10 2019 208 511.3 dated Apr. 4, 2020.
(Continued)

*Primary Examiner* — Antony M Paul
(74) *Attorney, Agent, or Firm* — Lempia Summerfield Katz LLC

(57) ABSTRACT

An arrangement for detecting a direction of rotation of a multi-phase electric motor includes a plurality of single-phase converters. Each single-phase converter of the plurality of single-phase converters supplies one phase of the multi-phase electric motor with current. The arrangement also includes two sensor units that are configured to determine actual values of the phase currents of the multi-phase electric motor and to transmit the actual values to the plurality of single-phase converters. The arrangement also includes a monitoring and control unit in each converter of the plurality of single-phase converters. The monitoring and control unit is configured and programmed to determine the direction of rotation and a speed of rotation of the multi-phase electric motor from the actual values.

17 Claims, 3 Drawing Sheets

(51) Int. Cl.
  *B60L 50/60* (2019.01)
  *B60L 15/00* (2006.01)
  *B64D 27/24* (2006.01)

(58) Field of Classification Search
  CPC .... H02P 29/032; H02P 29/40; H02P 2205/01; H02P 2201/01; H02P 2201/03; H02P 2201/07; H02P 2201/09; H02P 2201/11; H02P 2201/05; H02P 2203/09; H02P 21/00; H02P 21/18; H02P 21/22; H02P 23/00; H02P 23/07; H02P 6/08; H02P 6/04; H02P 6/18; B60W 10/08; B60W 20/20; B60W 2710/08; B60W 2510/083; B60W 2710/081; B60W 2710/083; B60L 2240/12; B60L 2240/421; B60L 2240/423; B60L 2240/441; B60L 2240/443; B60L 2200/10; B60L 2220/14; B60L 2220/12; B64C 27/12
  See application file for complete search history.

(56) References Cited

FOREIGN PATENT DOCUMENTS

| | | |
|---|---|---|
| DE | 102015226836 A1 | 7/2017 |
| DE | 102017209991 A1 | 12/2018 |
| EP | 0693374 B1 | 12/2002 |
| EP | 3001271 A1 | 3/2016 |

OTHER PUBLICATIONS

International Search Report and the Written Opinion for International Patent Application PCT/EP2020/065961 dated Sep. 8, 2020.

\* cited by examiner

DETECTING A DIRECTION OF MOTOR ROTATION IN SINGLE-PHASE CONVERTERS

This application is the National Stage of International Application No. PCT/EP2020/065961, filed Jun. 9, 2020, which claims the benefit of German Patent Application No. DE 10 2019 208 511.3, filed Jun. 12, 2019. The entire contents of these document are hereby incorporated herein by reference.

FIELD

The present embodiments relate to an arrangement having a plurality of single-phase converters and to detection of a direction of rotation of a multi-phase electric motor. The present embodiments also relate to a vehicle having an arrangement of this type.

BACKGROUND

A generic converter consists of a power output stage (e.g., semiconductor, DC link capacitor, driver circuit, as well as busbars and cooling), a control unit that drives the power output stage (e.g., µC, converts the setpoint into cycles), a plurality of sensors (e.g., for measuring current, voltage, temperature) that measure the state of the converter and of the electric motor and make the measured state available to the monitoring unit, as well as a voltage supply and, if necessary, an observation unit for protection purposes. The converter regulates an alternating current that flows through the windings of the multi-phase, usually three-phase, electric motor so that a torque is generated there.

The current measurement of the phases as well as the voltage measurement at the DC link are the most important sensor-based measurement variables in order that the monitoring unit may calculate the clocks from the setpoint values such that the electric motor assumes a desired number of revolutions with a desired torque in a desired direction.

For example, the number of revolutions and the rotor position in e-cars are known to be determined by a sensor unit, usually a resolver, attached to the electric motor. In applications in aviation, this is achieved through sensorless regulation using DC voltage and AC current measurement. With the latter, it is fundamentally important to know all three phase currents.

SUMMARY AND DESCRIPTION

The scope of the present invention is defined solely by the appended claims and is not affected to any degree by the statements within this summary.

The problem to be solved arises from the architectural approach of solving the requirement for non-failure in the case of single faults using a multi-lane approach. Multi-lane provides that there is no star point or there is more than one star point that are isolated from each other. This contrasts with the known approach that a three-phase machine has one star point. The advantage of such a multi-lane topology is that the failure of a winding system, regardless of whether it is in the motor or in the converter that feeds the respective winding system, does not provide a failure of the drive power, but at most a reduction in the maximum power. In other words, a single fault does not lead to a total failure of the drive function.

The present embodiments may obviate one or more of the drawbacks or limitations in the related art. For example, a solution by which multi-phase electric motors may be reliably supplied with electrical energy is provided.

One exemplary embodiment of a multi-lane approach to which reference is made in this application is a three-phase electric motor having three DC-isolated, single-phase winding systems. The implementation of the winding system in the electric motor is of secondary importance for the present embodiments. The independence of the three feeding converters is to be provided. Regardless of which single fault is assumed in the converter, it is not to lead to failure of more than one converter.

The single-phase converters are thus to act independently of one another. The problem that arises here is the fact that, for a regulated rotating field in the case of a permanent-magnet synchronous motor, the rotor position and the direction of rotation thereof is to be known, but assuming that no direct position and rotation measurements are made (e.g., by a resolver), this cannot be determined. This is because at least two phase current sensors (e.g., three sensors) are to be provided. This is because the single-phase converter only "knows" itself and its own phase.

A first aspect of the present embodiments includes breaking up the architecture of a generic three-phase converter for the reduction to single-phase converters. The sensor system for the load state identification is no longer assigned to the converter of the respective phase. Instead, a sensor unit is implemented selectively for the electric motor and the converters. The sensor unit is implemented in multiple versions (also here, no single fault may lead to a loss of the drive power) and, for example, measures the motor currents (possibly also voltages) of all phases and makes the measured motor currents available to all converters.

A power converter that uses an AC voltage or DC voltage to produce an AC voltage, the frequency and amplitude of which are varied, is referred to as a converter (e.g., an inverter). Converters are often designed as AC/DC-DC/AC converters or DC/AC converters, where an AC output voltage is generated from an AC input voltage or a DC input voltage via a DC link and switched semiconductors.

The present embodiments include an arrangement for detecting the direction of rotation of a multi-phase electric motor. The arrangement includes a plurality of single-phase converters. Each single-phase converter of the plurality of single-phase converters supplies one phase of the electric motor with current. The arrangement also includes two sensor units that are configured to determine actual values of the phase currents of the electric motor and to transmit the determined actual values of the phase currents to the converters. The arrangement includes a monitoring and control unit in each converter. The arrangement is designed and programmed to determine the direction of rotation and the speed of rotation of the electric motor from the actual values.

The present embodiments offer the advantage of a high tolerance with respect to partial failures of an electric drive arrangement.

In one development, the electric motor may be of a three-phase design, and the number of converters may be three.

In a further aspect of the present embodiments, the two sensor units are supplied from different batteries. The batteries may be selective HV batteries, and the sensor units are equipped with self-starting power supply units. The sensor units start up as soon as a minimum voltage is exceeded and then continuously provide measurement values. This provides that the individual sensor units are self-sufficient.

In one development, the arrangement may therefore have two DC voltage sources that supply the converters with electrical energy.

In a further configuration, each sensor unit may be supplied with electrical energy from in each case one of the two DC voltage sources.

In one development, the DC voltage source may be a battery (e.g., an HV battery).

In one development, a self-starting power supply unit may be formed in the sensor unit. The self-starting power supply unit supplies the sensor unit with voltage.

In a further aspect of the present embodiments, the sensor units are coupled to the converters either using selective DC-isolating elements (e.g., using coreless transformer technology) or with the aid of optical waveguides.

In one development, the arrangement may therefore have a selective DC-isolating element or an optical waveguide for data connection between the sensor unit and the converters.

In a further aspect of the present embodiments, the sensor values of the sensor units may be available as a digital data stream (e.g., as delta-sigma values).

Each converter is thus supplied with all actual phase current values and may independently calculate the rotor position and the speed of rotation. If one converter fails, the other converters "see" this and may react selectively if necessary. If one sensor unit fails, the converters will continue to be supplied with actual values of the phase currents from the other sensor unit. If a direct current source fails, only the sensor unit that is supplied using the corresponding DC voltage source fails.

In another aspect of the present embodiments, the arrangement may be arranged in a vehicle.

A vehicle may be any type of means of locomotion or transport means, whether manned or unmanned. An aircraft is a flying vehicle.

The present embodiments therefore include a vehicle (e.g., an aircraft) having an arrangement according to the present embodiments for an electric or hybrid-electric drive.

In a further development, the aircraft may be an airplane and have a propeller that may set the electric motor in rotation.

DETAILED DESCRIPTION

Figure 1:
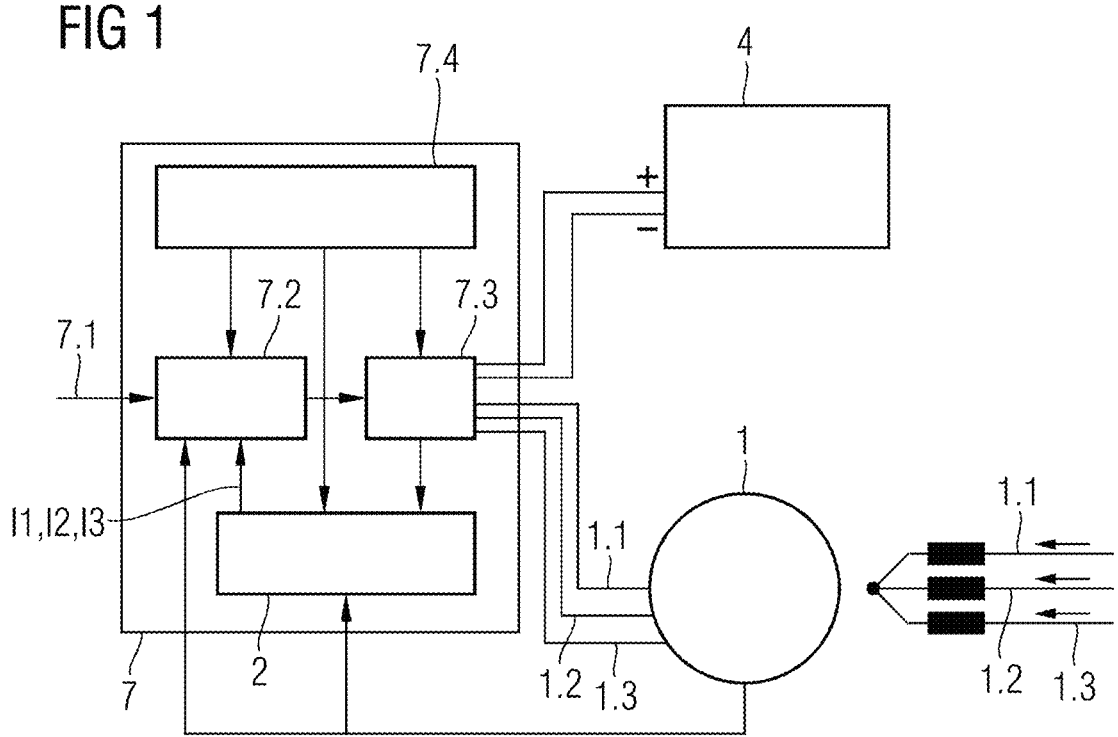
FIG. 1 shows a block diagram of an arrangement having a three-phase converter in accordance with the prior art.

FIG. 1 shows a block diagram of a generic arrangement having a three-phase converter 7 (e.g., a converter) and a three-phase electric motor 1 (e.g., an electric motor). The converter 7 is supplied with electrical energy by a DC voltage source 4 (e.g., from an 800 V battery). The converter 7 has a power supply unit 7.4, a control and monitoring unit 7.2, an output stage 7.3 having the switchable power semiconductors, and a sensor unit 2 for determining the actual current values I1, I2, I3 of the electric motor 1.

Motor current setpoint value 7.1 is fed to the control and monitoring unit 7.2. The three-phase converter 7 supplies the electric motor 1 with a current 1.1 of a first phase, a current 1.2 of a second phase, and a current 1.3 of a third phase.

Figure 2:
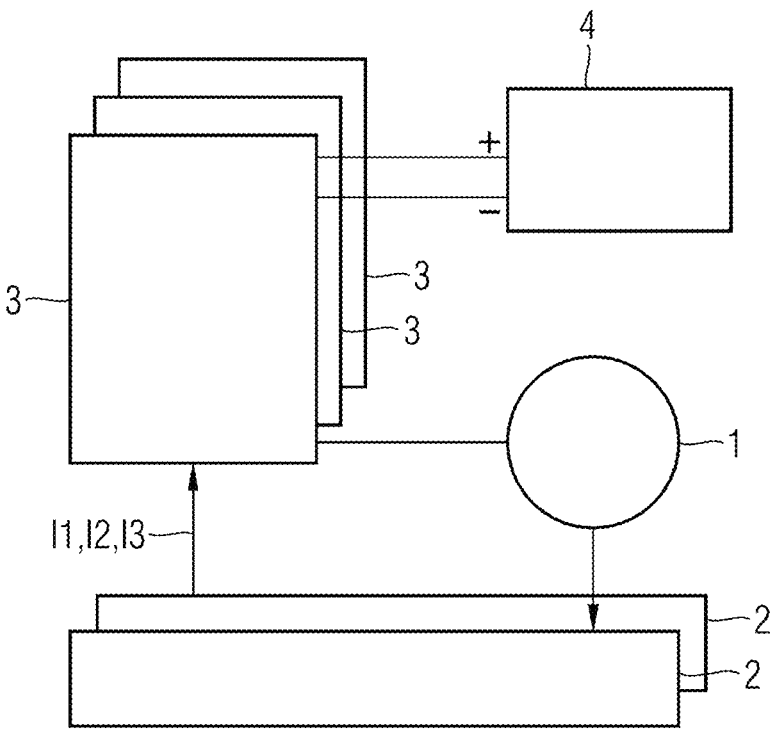
FIG. 2 shows a greatly simplified block diagram of one embodiment of an arrangement having three single-phase converters.

FIG. 2 shows a greatly simplified block diagram of one embodiment of an arrangement having three single-phase converters 3 (e.g., converters). The converters 3 feed a three-phase electric motor 1 with electrical energy. The electrical energy for the converters 3 is provided by one or more DC voltage sources 4 (e.g., a high-voltage battery). The actual values of the motor currents I1, I2, I3 are determined redundantly using the two sensor units 2 and passed on to the converters 3 for regulation.

Figure 3:
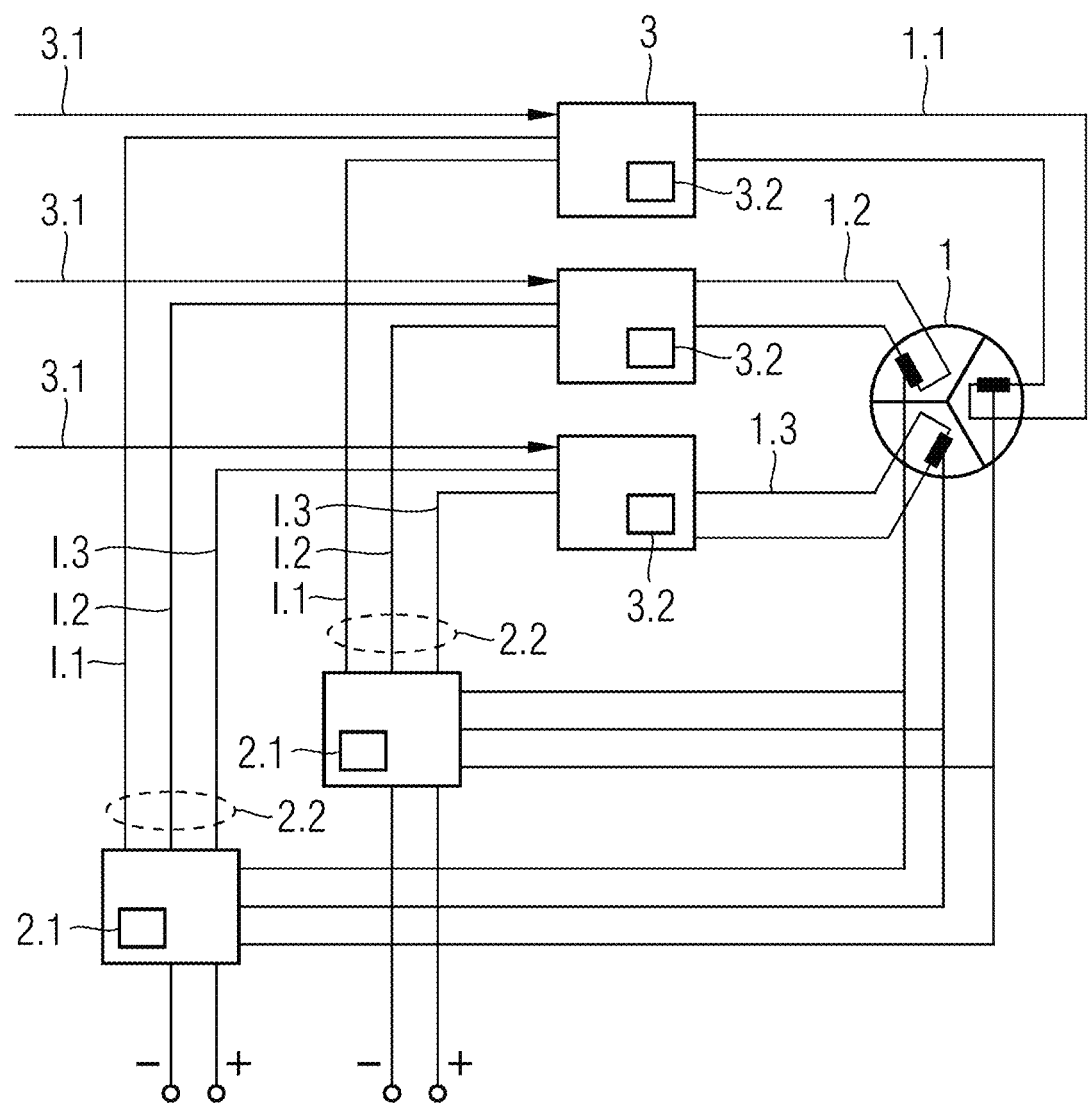
FIG. 3 shows a block diagram of one embodiment of an arrangement having three single-phase converters.

FIG. 3 shows a block diagram of one embodiment of an arrangement having three single-phase converters 3, which is more detailed compared to FIG. 2. As a default, the converters 3 receive a motor setpoint value 3.1, such as number of revolutions and torque. Each of the three converters 3 supplies one phase of the electric motor 1 with the currents 1.1, 1.2 and 1.3, accordingly. The actual value of the current of the first phase I1, the current of the second phase I2, and the current of the third phase I3 is determined with the aid of the two sensor units 2.

The actual values of the currents I1, I2, I3 are forwarded to the control and monitoring units 3.2 of the converters 3. The control and monitoring units 3.2 determine a direction of rotation and a position angle of a rotor of the electric motor 1 from a frequency and a phase position of at least two of the three actual values I1, I2 and I3. The DC-isolated connection between the sensor units 2 and the converters 3 is provided by optical waveguides 2.2.

For safe operation of the sensor units 2, the sensor units 2 are supplied from different DC voltage sources, which are not illustrated, and the sensor units 2 have a self-starting power supply unit 2.1 that starts up as soon as a minimum voltage is exceeded.

Figure 4:
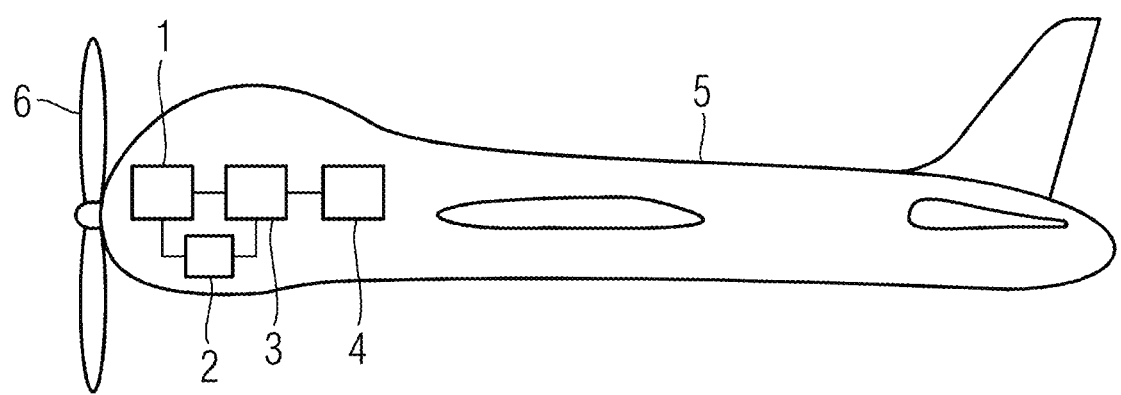
FIG. 4 shows one embodiment of an airplane having an arrangement having three single-phase converters.

FIG. 4 shows one embodiment of an electric or hybrid-electric aircraft 5 (e.g., an airplane) having three single-phase converters 3 in accordance with an arrangement according to FIG. 3. The arrangement supplies the electric motor 1 with electrical energy. The electric motor 1 drives a propeller 6. Both are part of an electrical thrust generating unit. The converter may also supply other electrical components.

Although the invention has been described and illustrated more specifically in detail using the exemplary embodiments, the invention is not restricted by the disclosed examples, and other variations may be derived therefrom by a person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An arrangement for detecting a direction of rotation of a multi-phase electric motor, the arrangement comprising:
    a plurality of single-phase converters, each single-phase converter of the plurality of single-phase converters supplying one phase of the multi-phase electric motor with current;
    two sensor units that are configured to determine actual values of phase currents of the multi-phase electric motor and to transmit the actual values of the phase currents to the plurality of single-phase converters; and
    a monitoring and control unit in each single-phase converter of the plurality of single-phase converters, the respective monitoring and control unit being configured and programmed to determine the direction of rotation and a speed of rotation of the multi-phase electric motor from the actual values of the phase currents.

2. The arrangement of claim 1, wherein the multi-phase electric motor is of a three-phase design, and the number of the plurality of single-phase converters is three.

3. The arrangement of claim 1, further comprising at least two DC voltage sources that supply the plurality of single-phase converters with electrical energy.

4. The arrangement of claim 3, wherein each sensor unit of the two sensor units is supplied with electrical energy by one of the at least two DC voltage sources.

5. The arrangement of claim 3, wherein the at least two DC voltage sources are batteries.

6. The arrangement of claim 1, wherein a sensor unit of the two sensor units comprises a self-starting power supply unit, the self-starting power supply unit being configured to supply the sensor unit with voltage.

7. The arrangement of claim 1, further comprising a selective DC-isolating element or an optical waveguide for data connection between a sensor unit of the two sensor units and the plurality of single-phase converters.

8. A vehicle comprising:
    an arrangement for an electric or hybrid-electric drive, the arrangement being for detecting a direction of rotation of a multi-phase electric motor, the arrangement comprising:
        a plurality of single-phase converters, each single-phase converter of the plurality of single-phase converters supplying one phase of the multi-phase electric motor with current;
        two sensor units that are configured to determine actual values of phase currents of the multi-phase electric motor and to transmit the actual values of the phase currents to the plurality of single-phase converters; and
        a monitoring and control unit in each single-phase converter of the plurality of single-phase converters, the respective monitoring and control unit being configured and programmed to determine the direction of rotation and a speed of rotation of the multi-phase electric motor from the actual values of the phase currents.

9. The vehicle of claim 8, wherein the vehicle is an aircraft.

10. The vehicle of claim 9, wherein the aircraft is an airplane.

11. The vehicle of claim 10, further comprising a propeller that is settable in rotation by the multi-phase electric motor.

12. The vehicle of claim 8, wherein the multi-phase electric motor is of a three-phase design, and the number of the plurality of single-phase converters is three.

13. The vehicle of claim 8, wherein the arrangement further comprises at least two DC voltage sources that supply the plurality of single-phase converters with electrical energy.

14. The vehicle of claim 13, wherein each sensor unit of the two sensor units is supplied with electrical energy by one of the at least two DC voltage sources.

15. The vehicle of claim 13, wherein the at least two DC voltage sources are batteries.

16. The vehicle of claim 8, wherein a sensor unit of the two sensor units comprises a self-starting power supply unit, the self-starting power supply unit being configured to supply the sensor unit with voltage.

17. The vehicle of claim 8, wherein the arrangement further comprises a selective DC-isolating element or an optical waveguide for data connection between a sensor unit of the two sensor units and the plurality of single-phase converters.

* * * * *